Patented Apr. 27, 1954

2,676,879

UNITED STATES PATENT OFFICE 2,676,879

METHOD OF DESTROYING UNDESIRABLE PLANTS

Arthur H. Schlesinger, Dayton, Ohio, assignor to Monsanto Chemical Company, St. Louis, Mo., a corporation of Delaware No Drawing. Application August 23, 1952, Serial No. 306,064

6 Claims. (Cl. 71—2.3)

The present invention provides new and highly valuable herbicidal compositions and methods of destroying or preventing plant growth for which said compositions are employed.

I have found that improved and very efficient herbicidal compositions are obtained when there are prepared oil-in-water emulsions of a ketone selected from the class consisting of $\alpha$- and $\beta$-naphthyl alkyl ketones in which the alkyl radical has from 1 to 4 carbon atoms. Examples of ketones useful for the present purpose are $\alpha$-naphthyl methyl ketone, $\beta$-naphthyl methyl ketone, $\alpha$-naphthyl propyl ketone, $\beta$-naphthyl isobutyl ketone and $\alpha$-naphthyl n-butyl ketone. The present ketones are readily obtainable, for example by reaction of naphthalene with an acyl halide or with an acid anhydride in the presence of a Friedel-Crafts type catalyst, by oxidation of $\alpha$- or $\beta$-alkylnaphthalene, etc.

Herbicidal compositions containing the present naphthyl alkyl ketones may be readily obtained by first preparing a solution of the ketone in an organic solvent and then adding the resulting solution to water containing an emulsifying agent to form an emulsion. Because of the very high herbicidal efficiency of the naphthyl alkyl ketones, they are present in the herbicidal compositions in only very small concentrations, for example, in concentrations of from 0.1 per cent to 2.0 per cent by weight of the total weight of the emulsion. Emulsifying agents which may be employed are those customarily used in the art for the preparation of oil-in-water emulsions. The word "oil" is here used to designate any liquid which is insoluble in water. Examples of emulsifying agents which may be used include alkylbenzenesulfonates, long-chained polyalkylene glycols, long-chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example, in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., soils, cinders, etc.

The oil-in-water emulsions of the present naphthyl alkyl ketones are particularly valuable in that when applied to the leaves of broad-leafed plants, they cause leaf-drop. Application of some of the present herbicidal compositions to such plants as cotton, beans and peas defoliates the plants and thus permits more efficient mechanical harvesting or hand-picking of the bolls or pods.

The present invention is further illustrated, but not limited, by the following examples.

Example I

Spray testing of the present herbicidal compositions was conducted as follows:

Respective cyclohexanone solutions of $\alpha$-naphthyl methyl ketone and $\beta$-naphthyl methyl ketone together with an emulsifying agent were respectively added to water, the quantity of solution employed being calculated to give emulsions containing 0.3 per cent and 1.0 per cent of the naphthyl methyl ketone, respectively, based on the total weight of each emulsion. The quantity of emulsifying agent used was 0.2 per cent by weight, based on the total weight of each emulsion. Said emulsifying agent comprised a mixture of a polyalkyleneglycol derivative and an alkylbenzenesulfonate.

Three-week old corn and bean plants, respectively, were sprayed with the emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Compound tested | At per-cent Concentration | Extent of Injury | |
|---|---|---|---|
| | | On Bean | On Corn |
| $\beta$-napthyl methyl ketone | 1.0 | Severe injury; Leaves dropped. | Plant dead; Leaves dried. |
| Do | 0.3 | None | Slight. |
| $\alpha$-napthyl methyl ketone | 1.0 | Severe injury | Plant dead; Leaves dried. |
| Do | 0.3 | None | Slight. |

Example II

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of cucumber, rye grass, radish and beet seeds, respectively, were prepared. The surface soil of the seeded boxes was then sprayed, respectively, with the 1.0 per cent and the 0.3 per cent emulsions of Example I. The quantity of each emulsion which was applied was calculated to correspond to either 20 pounds of the ketone per acre or to 50 pounds per acre. In the present instance, 10.8 cc. of the 0.3 per cent emulsion per 25 square inches of surface soil was calculated to correspond to 20 pounds of the chemical per acre and 9.1 cc. of the 1.0 per cent emulsion to 50 pounds of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of non-emerging and damaged seedlings was obtained by difference. This difference is designated as "X". "Percent phytotoxicity" was determined by the ratio of "X" to the number of healthy seedlings in the controls.

There was evidenced a 71–100 per cent phytotoxicity to beets, radishes and rye grass for the α-naphthyl methyl ketone at the 50 pound per acre rate of application and a phytotoxicity of up to 46 per cent of cucumbers at the same rate of application. At the 20 pound rate there was evidenced a phytotoxicity of the α-naphthyl methyl ketone of from 71–100 per cent against beet, of from 46–71 per cent for radish and rye, and of up to 46 per cent against cucumber. The β-naphthyl methyl ketone did not show so marked an activity. With this ketone there was demonstrated at the 50 pound per acre rate of application of ketone of a phytotoxicity of 71—100 per cent against beet, 46–71 per cent against rye grass, and up to 46 per cent against radish and cucumber. At the 20 pound per acre rate of application, the β-naphthyl methyl ketone showed a phytotoxicity of up to 46 per cent against beet but no phytotoxicity against cucumber, radish, or rye grass.

Example III

While the present naphthyl alkyl ketones are most advantageously employed as herbicides by incorporating them into aqueous emulsions as herein described they may also be employed in other plant destroying methods. Thus they may be incorporated into solid carriers such as clay, talc, pumice, and bentonite to give herbicidal compositions which may be applied to living plants or to surfaces which are to be freed from plant growth. The ketones may also be mixed with liquid or solid agricultural pesticides, e. g., insecticides and fungicides. While solutions of the compounds in organic solvents may be employed for preventing and destroying plant growth, we have found that the emulsions possess and improved tendency to adhere to the treated surfaces and that less of the active ingredient, i. e., the naphthyl alkyl ketones, are required to give comparable herbicidal efficiency.

What I claim is:

1. The method of destroying undesirable plants which comprises applying to said plant a toxic quantity of a herbicidal composition comprising a ketone selected from the class consisting of α-naphthyl alkyl ketones and β-naphthyl alkyl ketones in which the alkyl radical has from 1 to 4 carbon atoms.

2. The method of preventing plant growth which comprises applying to media normally supporting said growth, a herbicidal composition comprising a ketone selected from the class consisting of α-naphthyl alkyl ketones and β-naphthyl alkyl ketones in which the alkyl radical has from 1 to 4 carbon atoms.

3. The method of defoliating plants which comprises applying to the foliage of the said plants a herbicidal composition comprising a ketone selected from the class consisting of α-naphthyl alkyl ketones and β-naphthyl alkyl ketones in which the alkyl radical has from 1 to 4 carbon atoms.

4. The method of destroying undesirable plants which comprises applying to said plants a toxic quantity of a herbicidal composition comprising an oil-in-water emulsion of a ketone selected from the class consisting of α-naphthyl alkyl ketones and β-naphthyl alkyl ketones in which the alkyl radical has from 1 to 4 carbon atoms.

5. The method of destroying undesirable plants which comprises applying to said plants a toxic quantity of a herbicidal composition comprising an oil-in-water emulsion of α-naphthyl methyl ketone.

6. The method of destroying undesirable plants which comprises applying to said plants a toxic quantity of a herbicidal composition comprising an oil-in-water emulsion of β-naphthyl methyl ketone.

References Cited in the file of this patent

UNITED STATES PATENTS

| Number | Name | Date |
|---|---|---|
| 2,283,471 | Swaine | May 19, 1942 |